(12) United States Patent
Inoue et al.

(10) Patent No.: US 10,654,510 B2
(45) Date of Patent: May 19, 2020

(54) ELECTRIC STEERING COLUMN APPARATUS

(71) Applicant: FUJI KIKO CO., LTD., Kosai-shi, Shizuoka (JP)

(72) Inventors: Kyoichi Inoue, Kosai (JP); Takeshi Miyagi, Kosai (JP); Daisuke Terada, Kosai (JP); Tomoya Ohashi, Kosai (JP)

(73) Assignee: FUJI KIKO CO., LTD., Kosai-Shi, Shizuoka (JP)

( * ) Notice: Subject to any disclaimer, the term of this patent is extended or adjusted under 35 U.S.C. 154(b) by 0 days.

(21) Appl. No.: 16/109,810

(22) Filed: Aug. 23, 2018

(65) Prior Publication Data

US 2019/0061802 A1    Feb. 28, 2019

(30) Foreign Application Priority Data

Aug. 28, 2017   (JP) .................................. 2017-163048
Aug. 28, 2017   (JP) .................................. 2017-163050

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *B62D 1/181* | (2006.01) |
| *F16H 25/20* | (2006.01) |
| *B62D 1/185* | (2006.01) |

(52) U.S. Cl.
CPC ............. *B62D 1/181* (2013.01); *B62D 1/185* (2013.01); *F16H 25/20* (2013.01)

(58) Field of Classification Search
CPC ........ B62D 1/181; B62D 1/185; B62D 1/184; B62D 1/195
See application file for complete search history.

(56) References Cited

U.S. PATENT DOCUMENTS

| | | | |
|---|---|---|---|
| 8,650,982 B2* | 2/2014 | Matsuno ................ | B62D 1/181 74/492 |
| 8,967,016 B2* | 3/2015 | Uesaka .................. | B62D 1/181 280/775 |
| 2006/0191368 A1* | 8/2006 | Sawada .................. | B62D 1/181 74/495 |

FOREIGN PATENT DOCUMENTS

| | | |
|---|---|---|
| JP | 2010-83392 A | 4/2010 |
| JP | 2014-231288 A | 12/2014 |

* cited by examiner

*Primary Examiner* — Jake Cook
(74) *Attorney, Agent, or Firm* — Nath, Goldberg & Meyer; Jerald L. Meyer

(57) ABSTRACT

An electric steering column apparatus includes a pressing mechanism for reducing the play between an outer jacket and an inner jacket. A pressing mechanism has a first pressing portion disposed on the outer jacket and pressing a lower surface of the inner jacket upward and a second pressing portion disposed on an axially front end side of the outer jacket and pressing an upper surface of the inner jacket downward. A tubular member housing a telescopic nut is disposed between the first pressing portion and the second pressing portion in an axial direction so as to face the second pressing portion in an up-down direction and fixed to the lower surface of the inner jacket.

5 Claims, 5 Drawing Sheets

ELECTRIC STEERING COLUMN APPARATUS

CROSS REFERENCE TO RELATED APPLICATION

The present application is based on, and claims priority from Japanese Patent Application No. 2017-163050, filed Aug. 28, 2017; and 2017-163048, filed Aug. 28, 2017, the disclosure of which is hereby incorporated by reference herein in its entirety.

TECHNICAL FIELD

The present invention relates to electric steering column apparatuses.

BACKGROUND ART

Electric steering column apparatuses have been publicly known conventionally (for example, see Patent Literature 1: Japanese Patent Application Publication No. 2010-83392, Patent Literature 2: Japanese Patent Application Publication No. 2014-231288).

One of the electric steering column apparatuses of this kind includes a steering column supported on the vehicle body, a steering shaft rotatably supported by the steering column, and a telescopic mechanism driven by an electric motor. In such an electric steering column apparatus, the steering column has an outer jacket and an inner jacket inserted into the outer jacket so as to be axially movable relative to the outer jacket.

An electric steering column apparatus described in Patent Literature 1 has a pressing mechanism for reducing the play between the outer jacket and the inner jacket. This pressing mechanism has pressing members disposed at two positions apart from each other in the axial direction of the outer jacket, and each pressing member presses the inner jacket radially inward from the outer jacket side.

One of the electric steering column apparatuses of this kind includes a steering column supported on the vehicle body, a steering shaft rotatably supported by the steering column, and a telescopic mechanism driven by an electric motor. In such an electric steering column apparatus, the steering column has an outer jacket, an inner jacket inserted into the outer jacket so as to be axially movable relative to the outer jacket, and a mid jacket interposed between the outer jacket and the inner jacket. The inner jacket is press-fitted and fixed to the mid jacket and is normally integrally held with the mid jacket.

An electric steering column apparatus described in Patent Literature 2 has a stopper mechanism so that the inner jacket does not circumferentially rotate relative to the mid jacket. This stopper mechanism includes an elongated hole formed in the upper jacket along the axial direction and a stopper fixed to the mid jacket and inserted into the elongated hole of the upper jacket.

SUMMARY

In the electric steering column apparatus described in above Patent Literature 1, both of the pressing members disposed at two positions apart from each other in the axial direction of the outer jacket press the upper surface of the outer jacket downward. For this reason, in a circumferential position at which the pressing members are disposed, a gap exists between the inner peripheral surface of the outer jacket and the outer peripheral surface of the inner jacket, and this is a factor that decreases the support rigidity for the inner shaft and the smoothness of the operation.

To address this, an object of the present invention is to provide an electric steering column apparatus that has improved support rigidity for the inner shaft and also improves the smoothness of operation of the inner shaft.

An electric steering column apparatus according to the present invention includes: a steering column supported on a vehicle body; a steering shaft rotatably supported by the steering column; and a telescopic mechanism driven by an electric motor. The steering column has a tubular outer jacket and a tubular inner jacket inserted into the outer jacket so as to be axially movable relative to the outer jacket. The telescopic mechanism has a tubular member fixed to an outer peripheral surface of the inner jacket and a telescopic nut that is disposed inside the tubular member and with which a shaft portion of the electric motor is threadedly engaged. A pressing mechanism is provided to reduce play between the outer jacket and the inner jacket. The pressing mechanism has a first pressing portion disposed on the outer jacket and pressing a lower surface of the inner jacket upward and a second pressing portion disposed on an axially front end side of the outer jacket and pressing an upper surface of the inner jacket downward. The tubular member is disposed between the first pressing portion and the second pressing portion in an axial direction so as to face the second pressing portion in an up-down direction and fixed to the lower surface of the inner jacket.

The electric steering column apparatus according to the present invention has improved support rigidity for the inner shaft and also improves the smoothness of operation of the inner shaft.

The electric steering column apparatus described above Patent Literature 2 has a problem that because the foregoing stopper is a separate piece from the mid jacket, there must be some work at assembly, for example, to fix the stopper to the mid jacket by caulking, and this increases the part count and decreases the ease of assembly.

To address this, an object of the present invention is to provide an electric steering column apparatus that has a simplified anti-rotation structure of the inner jacket and also improves the ease of assembly.

An electric steering column apparatus according to the present invention includes: a steering column supported on a vehicle body; a steering shaft rotatably supported by the steering column; and a telescopic mechanism driven by an electric motor. The steering column has a tubular outer jacket, a tubular inner jacket inserted into the outer jacket so as to be axially movable relative to the outer jacket, and a mid jacket interposed between the outer jacket and the inner jacket. The telescopic mechanism has a tubular member fixed to an outer peripheral surface of the mid jacket and a telescopic nut that is disposed inside the tubular member and with which a shaft portion of the electric motor is threadedly engaged. The mid jacket has a through hole passing through the mid jacket and communicating with an inside of the tubular member, and the telescopic nut has a stopper protrusion protruding through the through hole into an inside of the mid jacket. An elongated hole formed in the inner jacket along an axial direction is engaged with the stopper protrusion.

The electric steering column apparatus according to the present invention has a simplified anti-rotation structure of the inner jacket and also improves the ease of the assembly.

DESCRIPTION OF EMBODIMENTS

Hereinafter, an embodiment of the present invention will be described in detail with reference to the drawings.

Figure 1:
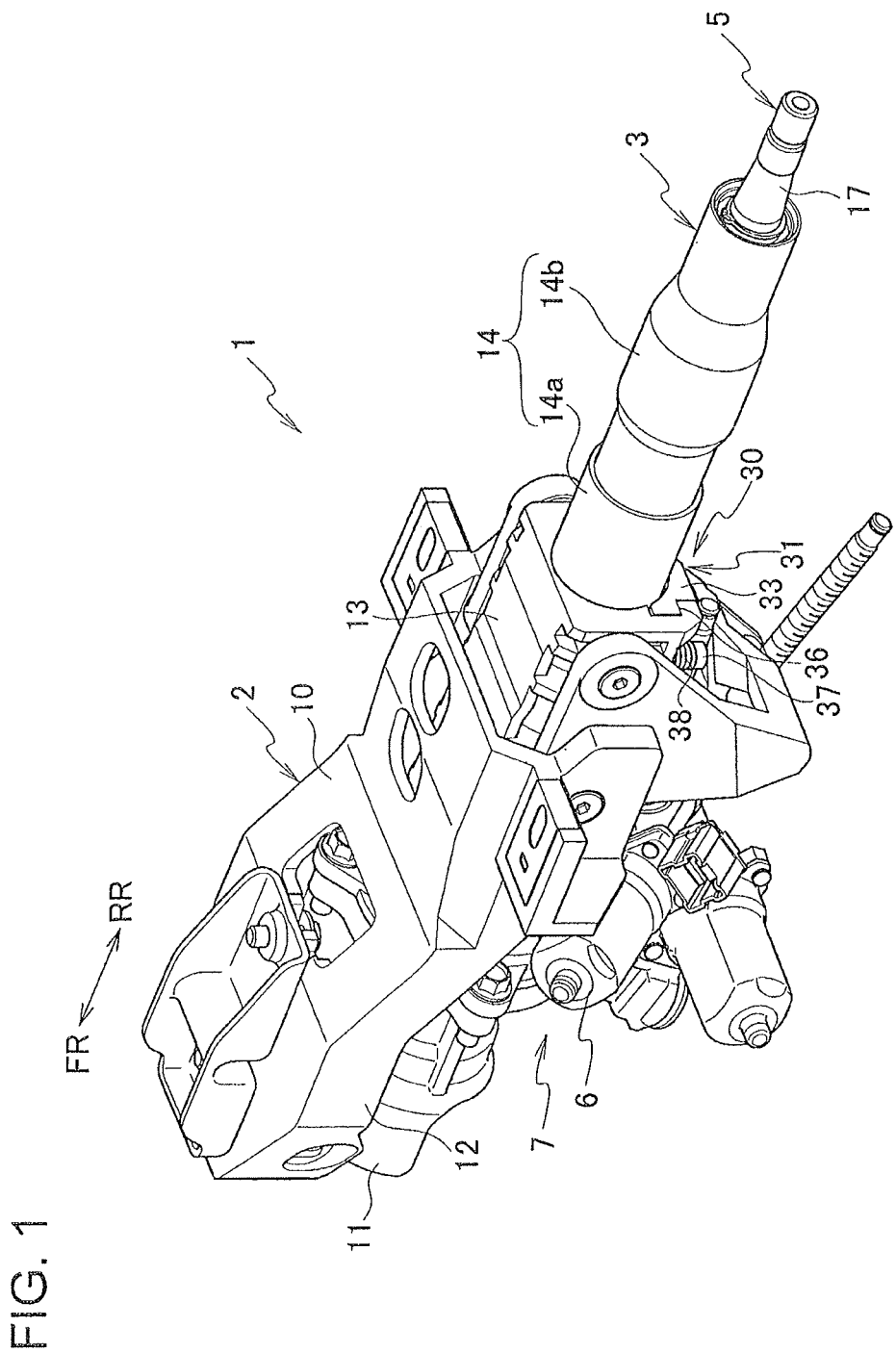
FIG. 1 is a perspective view of an electric steering column apparatus according to an embodiment of the present invention.

Note that in FIG. 1, arrow FR indicates the vehicle front direction, and arrow RR indicates the vehicle rear direction.

As illustrated in FIGS. 1 to 4, an electric steering column apparatus 1 includes a vehicle-body mounting bracket 2 fixed to the vehicle body and a steering column 3 swingably supported by the vehicle-body mounting bracket 2 in the vehicle up-down direction.

The electric steering column apparatus 1 also includes a steering shaft 5 rotatably supported by the steering column 3 and having a rear end to which a steering wheel 4 (see FIG. 3) is connected and a telescopic mechanism 7 driven by an electric motor 6.

The vehicle-body mounting bracket 2 integrally has a bracket body 10 and a pair of side walls 12, 12 extending downward from the bracket body 10 and disposed on both left and right sides of a swing support portion (front end support portion) 11 of the steering column 3. The bracket body 10 extends in the vehicle front-rear direction and is fixed to the vehicle body. Each side wall 12 extends in the vehicle front-rear direction, like the bracket body 10. The vehicle-body mounting bracket 2 is, for example, a die-cast product (aluminum cast product) made of aluminum or an aluminum alloy.

The steering column 3 has a tubular outer jacket 13 and a tubular inner jacket 14 inserted inside the outer jacket 13 so as to be axially movable relative to the outer jacket 13. The inner jacket 14 has a lower inner jacket (mid jacket) 14a on the steered wheel side and an upper inner jacket (inner jacket) 14b on the steering wheel 4 side. The lower inner jacket (mid jacket) 14a is interposed between the outer jacket 13 and the upper inner jacket (inner jacket) 14b. The upper inner jacket (inner jacket) 14b is fixed to the lower inner jacket (mid jacket) 14a by press fitting and is usually held integrally with the lower inner jacket (mid jacket) 14a. The outer jacket 13 is, for example, a die-cast product (aluminum cast product) made of aluminum or an aluminum alloy. The lower inner jacket (mid jacket) 14a and the upper inner jacket (inner jacket) 14b are, for example, formed of a metal material, such as steel.

The steering shaft 5 includes a lower shaft 16 on the steered wheel side and an upper shaft 17 connected to the steering wheel 4, and the lower shaft 16 and the upper shaft 17 are connected to each other such that the relative rotation is restricted but the relative axial movement is allowed. The upper shaft 17 is rotatably supported by the steering column 3 via a bearing (bearing on the rear end side) 18. The lower shaft 16 is rotatably supported by the steering column 3 via a bearing (bearing on the front end side) 19, and a universal joint 20 is connected to the front end of the lower shaft 16.

Next, the telescopic mechanism 7 will be described.

Figure 2:
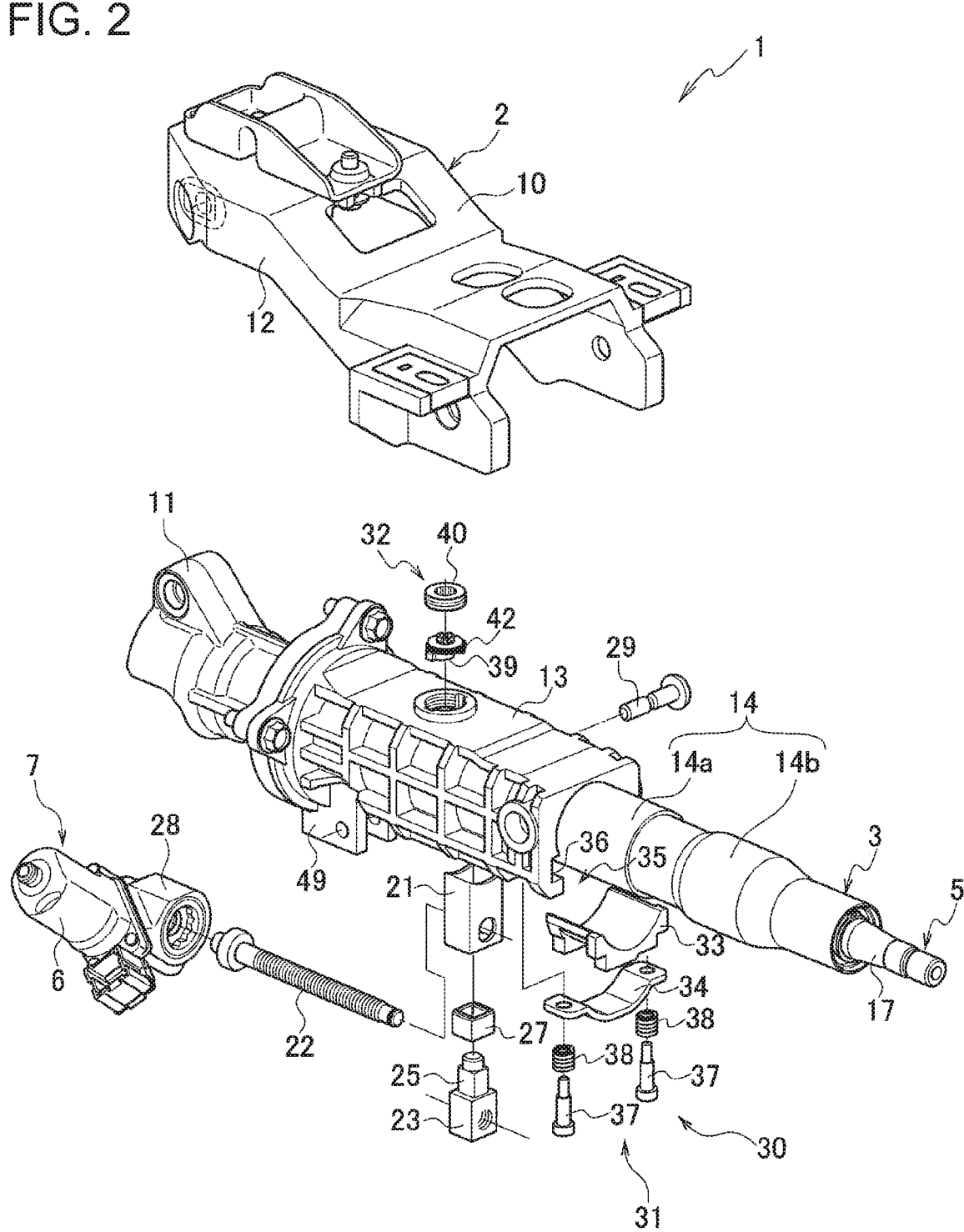
FIG. 2 is an exploded perspective view of the electric steering column apparatus according to the embodiment of the present invention.
Figure 3:
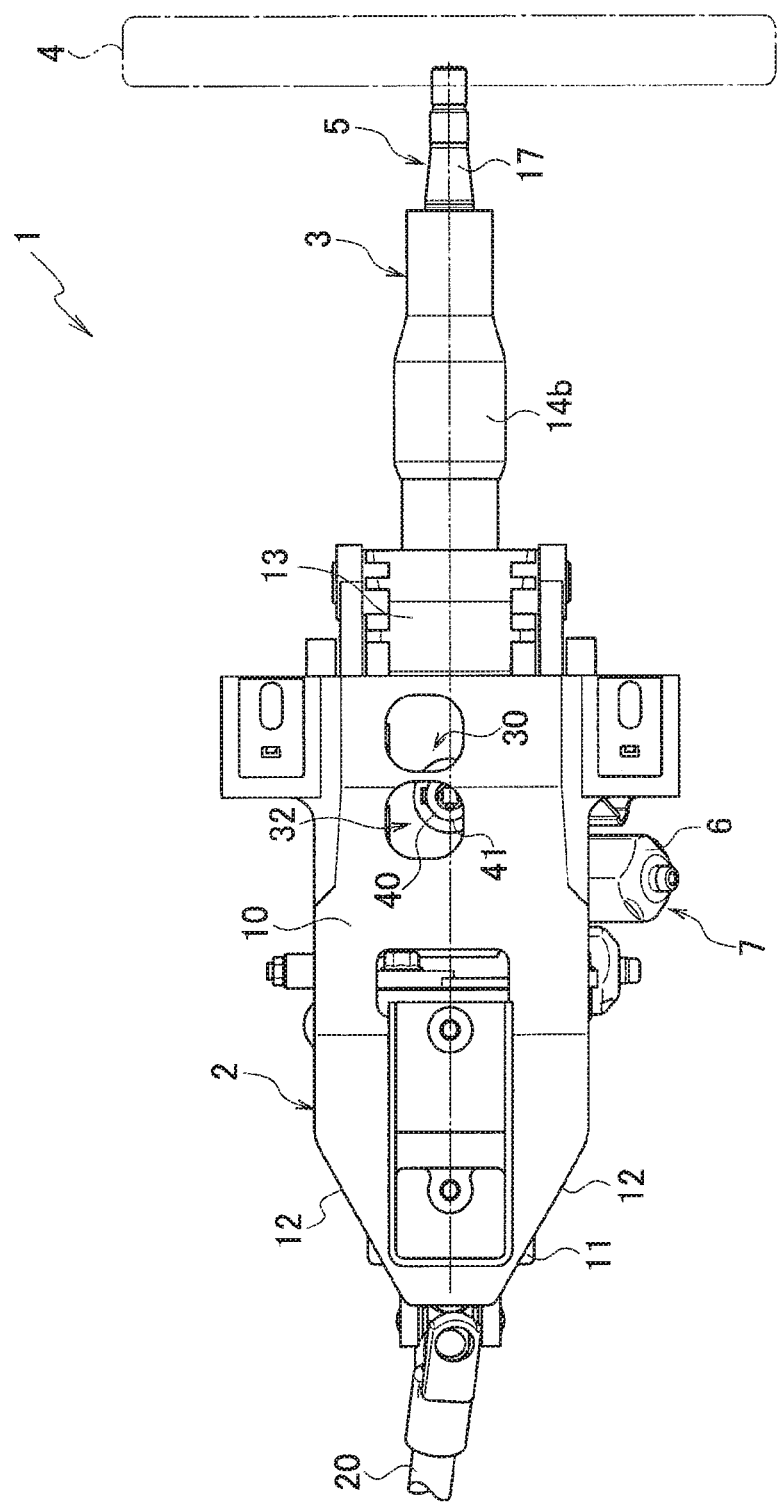
FIG. 3 is a plan view of the electric steering column apparatus according to the embodiment of the present invention.
Figure 4:
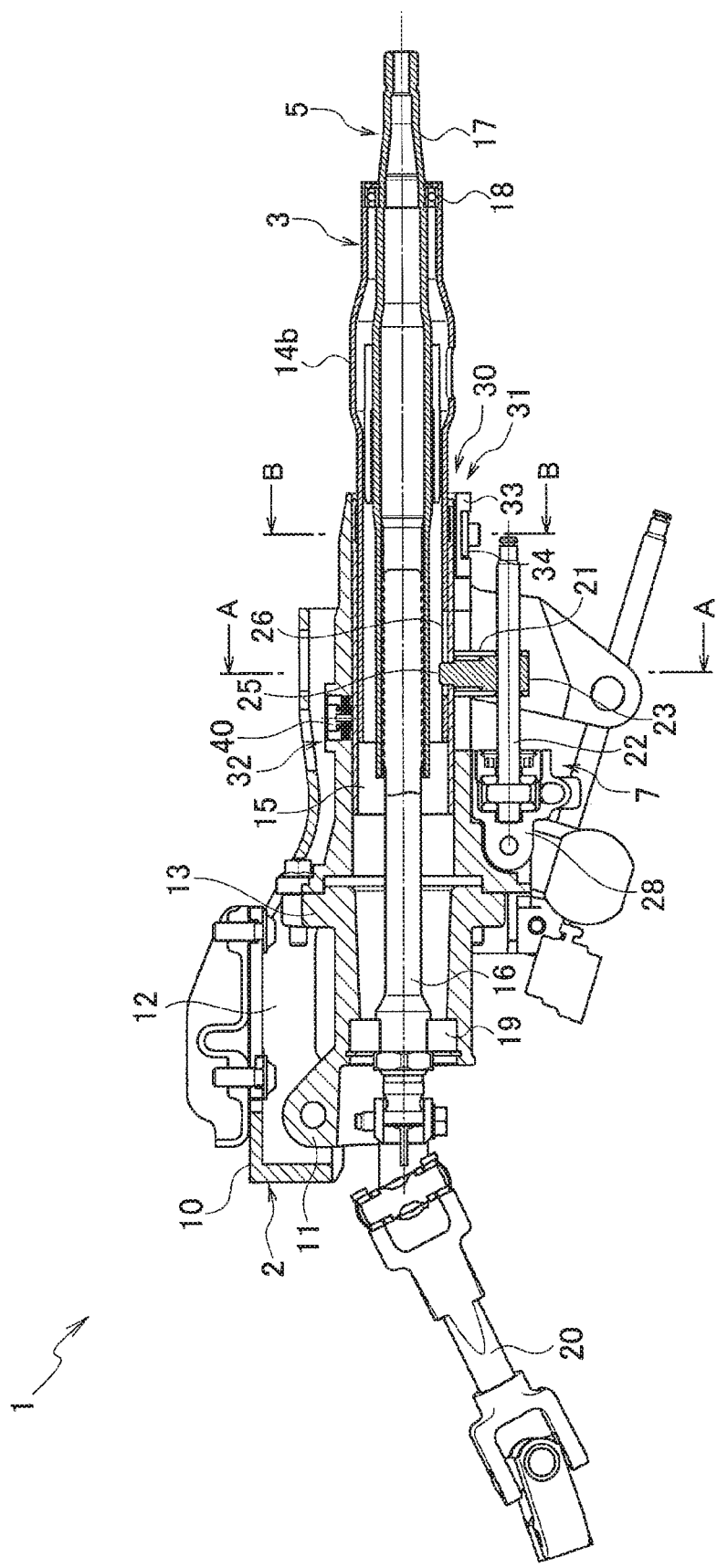
FIG. 4 is a side sectional view of the electric steering column apparatus according to the embodiment of the present invention.
Figure 5:
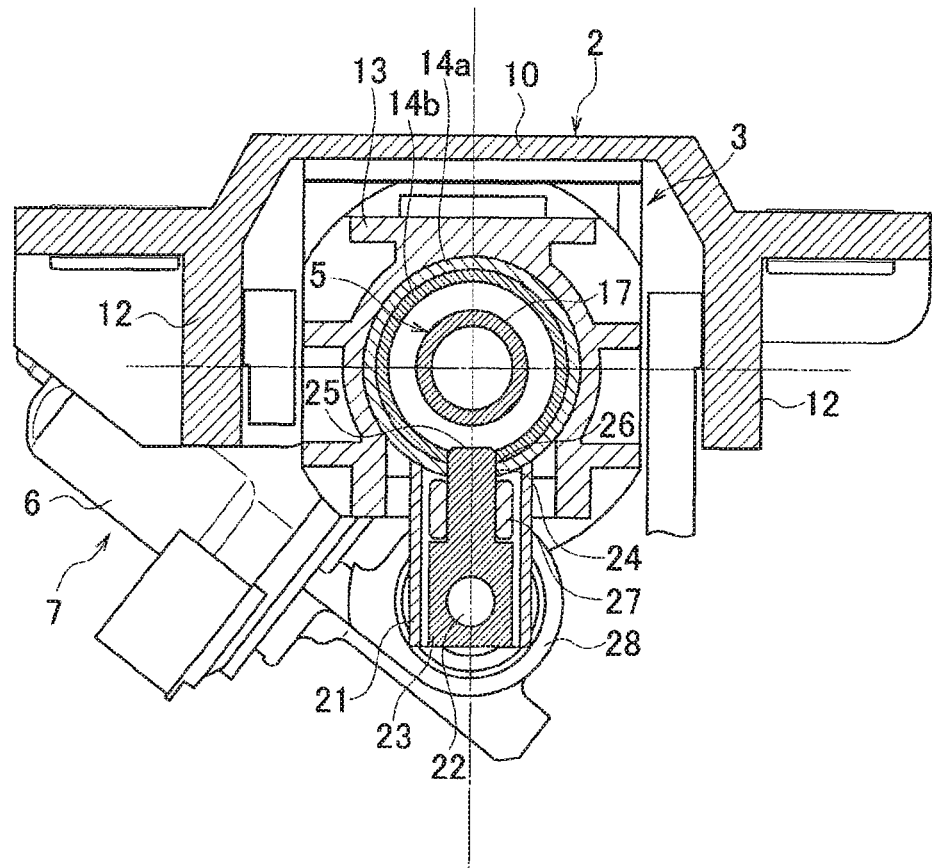
FIG. 5 is a cross-sectional view taken along line A-A in FIG. 4.

As illustrated in FIGS. 2, 4, and 5, the telescopic mechanism 7 has a tubular member 21 fixed to the outer peripheral surface of the lower inner jacket 14a and a telescopic nut 23 which is disposed inside the tubular member 21 and to which a screw shaft 22 screw shaft 22 of the electric motor 6 is threadedly engaged.

The lower inner jacket 14a has a through hole 24 formed to pass through the lower inner jacket 14a and communicate with the inside of the tubular member 21, and the telescopic nut 23 has a stopper protrusion 25 formed to protrude through the through hole 24 into the lower inner jacket 14a. The stopper protrusion 25 is formed integrally with the telescopic nut 23 and is inserted into (fitted with some play to) the through hole 24 formed in the lower inner jacket 14a. The distal end of the stopper protrusion 25 is engaged with (fitted with some play to) an elongated hole 26 formed in the upper inner jacket 14b along the axial direction. The tubular member 21, which is formed, for example, of a metal material such as steel, is fixed to the outer peripheral surface of the lower inner jacket 14a by welding.

Between the tubular member 21 and the telescopic nut 23 is disposed a bush 27. Specifically, the bush 27 is disposed between the inner peripheral surface of the tubular member 21 and the outer peripheral surface of the stopper protrusion 25. The bush 27 is, for example, an elastic bush formed of an elastic material such as rubber or a plastic material.

The electric motor 6 is equipped with a speed reduction gear mechanism 28 and the screw shaft 22, and the screw shaft 22 is threadedly engaged with the telescopic nut 23 disposed inside the tubular member 21. The electric motor 6 is rotatably supported by a motor support portion 49 formed below the outer jacket 13, using a motor support pin 29 (see FIG. 2).

Next, description will be provided for a pressing mechanism 30 for reducing the play between the outer jacket 13 and the inner jacket 14.

Figure 6:
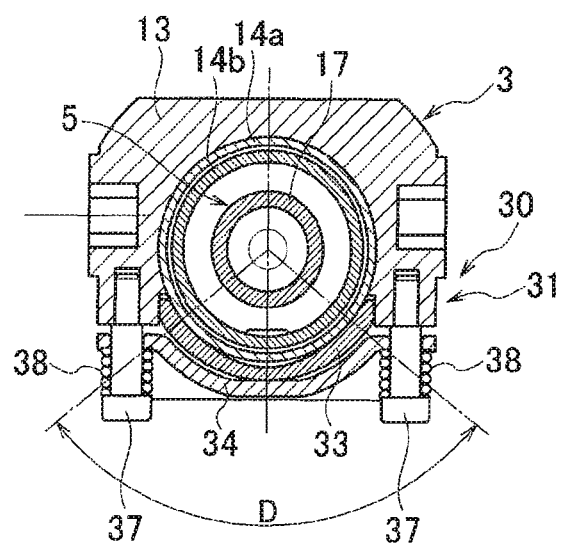
FIG. 6 is a cross-sectional view taken along line B-B in FIG. 4.

As illustrated in FIGS. 4 and 6, the inner peripheral surface of the outer jacket 13 and the outer peripheral surface of the lower inner jacket 14a, which are fitted to each other, are formed to be smooth surfaces without protrusions or the like and have circular cross sections with almost the same radius.

As illustrated in FIG. 4, the pressing mechanism 30 has a first pressing portion 31 disposed on the outer jacket 13 and pressing the lower surface of the lower inner jacket 14a upward and a second pressing portion 32 disposed on the outer jacket 13 and pressing the upper surface of the lower inner jacket 14a downward. In other words, the first pressing portion 31 and the second pressing portion 32 are disposed with a phase difference of 180 degrees in between in the circumferential direction (see FIGS. 4 and 6). The first pressing portion 31 is disposed on the axially rear end side of the outer jacket 13, and the second pressing portion 32 is disposed on the axially front end side of the outer jacket 13. In other words, the first pressing portion 31 and the second pressing portion 32 are disposed with a distance in between also in the axial direction (see FIG. 4).

As illustrated in FIGS. 2 and 6, the first pressing portion 31 has a slide contact member (first slide contact member) 33 which is in contact with the lower surface of the lower inner jacket 14a at two points apart from each other by a certain angle D in the circumferential direction, and a pressing member (first pressing member) 34 pressing the first slide contact member 33 against the lower surface of the lower inner jacket 14a. In other words, the first pressing portion 31 reduces the play that can occur between the outer jacket 13 and the inner jacket 14, by pressing the lower inner jacket 14a against the inner peripheral surface of the outer jacket 13 using the first slide contact member 33. The certain angle D is, for example, an angle between 90 and 120 degrees inclusive.

The outer jacket 13 has an opening 35 formed in the lower surface thereof from the rear end side along the axial direction, and in the opening 35 is disposed the tubular member 21 fixed to the lower surface of the lower inner jacket 14a. The first pressing member 34 is disposed so as to close the axially rear end portion of the opening 35, and the first slide contact member 33 is disposed between the first pressing member 34 and the lower surface of the lower inner jacket 14a. The first slide contact member 33 is inserted into slots 36 (FIG. 2) formed at the axially rear end portion of the outer jacket 13 and is held there, and the first pressing member 34 is fixed (threadedly fixed) to the axially rear end portion of the outer jacket 13 using bolts 37. Between the first pressing member 34 and the head of each bolt 37 is interposed a spring (first spring) 38. The first spring 38 is, for example, a coil spring.

As illustrated in FIGS. 2 and 4, the second pressing portion 32 has a slide contact member (second slide contact member) 39 which is in contact with the upper surface of the lower inner jacket 14a and a pressing member (second pressing member) 40 pressing the second slide contact member 39 against the upper surface of the lower inner jacket 14a. In other words, the second pressing portion 32 reduces the play that can occur between the outer jacket 13 and the inner jacket 14, by pressing the lower inner jacket 14a against the inner peripheral surface of the outer jacket 13, using the second pressing member 40.

The outer jacket 13 has a through hole (column through hole) 41 formed in the upper surface thereof, and in the column through hole 41 are disposed the second slide contact member 39 and the second pressing member 40. The second pressing member 40 is fixed (threadedly fixed) to the column through hole 41. To threadedly fix the second pressing member 40 to the column through hole 41, the outer peripheral surface of the second pressing member 40 and the inner peripheral surface of the column through hole 41 are threaded (subjected to a threading process). In addition, between the second slide contact member 39 and the second pressing member 40 is interposed a spring (second spring) 42. The second spring 42 is, for example, a disc spring.

In the electric steering column apparatus 1 of this embodiment, the electric motor 6 pushes or pulls the tubular member 21 disposed at the lower surface of the lower inner jacket 14a to move the inner jacket 14 in the vehicle front-rear direction. The operation of this movement moves the steering wheel 4 connected at the rear end of the steering shaft 5 in the vehicle front-rear direction to adjust the position of the steering wheel 4 in the telescopic movement.

The operational effect of this embodiment will be described below.

(1) The electric steering column apparatus 1 includes the steering column 3 supported on the vehicle body, the steering shaft 5 rotatably supported by the steering column 3, and the telescopic mechanism 7 driven by the electric motor 6. The steering column 3 has the tubular outer jacket 13 and the tubular inner jacket 14 inserted into the outer jacket 13 so as to be axially movable relative to the outer jacket 13. The telescopic mechanism 7 has the tubular member 21 fixed to the outer peripheral surface of the inner jacket 14 (lower inner jacket 14a) and the telescopic nut 23 which is disposed inside the tubular member 21 and with which the shaft portion (screw shaft 22) of the electric motor 6 is threadedly engaged. The pressing mechanism 30 is provided to reduce the play between the outer jacket 13 and the inner jacket 14. The pressing mechanism 30 has the first pressing portion 31 disposed on the outer jacket 13 and pressing the lower surface of the inner jacket 14 (lower inner jacket 14a) upward and the second pressing portion 32 disposed on the axially front end side of the outer jacket 13 and pressing the upper surface of the inner jacket 14 (lower inner jacket 14a) downward. The tubular member 21 is disposed between the first pressing portion 31 and the second pressing portion 32 in the axial direction, and the tubular member 21 is disposed to face the second pressing portion 32 in the up-down direction and fixed to the lower surface of the inner jacket 14 (lower inner jacket 14a).

This arrangement of the first pressing portion 31 and the second pressing portion 32 makes the inner peripheral surface of the outer jacket 13 in contact with the upper end side of the outer peripheral surface of the inner jacket 14 at an axially rear end position, and makes the inner peripheral surface of the outer jacket 13 in contact with the lower end side of the outer peripheral surface of the inner jacket 14 at an axially front end position. This arrangement achieves high support rigidity for the inner jacket 14, compared to the case where the first pressing portion 31 and the second pressing portion 32 are disposed at the same position in the circumferential direction.

The first pressing portion 31 and the second pressing portion 32 are disposed on the opposite sides in the up-down direction, and thus the inner jacket 14 can always be inclined with respect to the outer jacket 13. However, the telescopic nut 23, which is part of the telescopic mechanism 7, is disposed on the opposite side from the second pressing portion 32 in the up-down direction, and this suppresses the deterioration of the smoothness of operation especially at the time of pulling in the inner jacket 14.

Thus, the electric steering column apparatus 1 according to this embodiment has improved support rigidity for the inner jacket 14 and also improves the smoothness of the operation of the inner jacket 14.

(2) The first pressing portion 31 has the slide contact member (first slide contact member) 33 in contact with the lower surface of the inner jacket 14 (lower inner jacket 14a) at two points apart from each other by an angle between 90 and 120 degrees inclusive in the circumferential direction and the pressing member (first pressing member) 34 pressing the slide contact member (first slide contact member) 33 against the lower surface of the inner jacket 14 (lower inner jacket 14a).

Since the first slide contact member 33 supports the axially rear end portion of the inner jacket 14 at two points apart from each other by an angle between 90 and 120 degrees inclusive in the circumferential direction, it is possible to improve the support rigidity for the inner jacket 14 not only in the up-down direction but also in the right-left direction.

(3) The opening 35 is formed in the lower surface of the outer jacket 13 from the rear end side along the axial direction, and the tubular member 21 fixed to the lower surface of the inner jacket 14 (lower inner jacket 14a) is disposed in the opening 35. The pressing member (first pressing member) 34 is disposed to close the axially rear end portion of the opening 35, and the slide contact member (first slide contact member) 33 is disposed between the pressing member (first pressing member) 34 and the lower surface of the inner jacket 14 (lower inner jacket 14a).

Aligning the tubular member 21, which is part of the telescopic mechanism 7, and the first pressing portion 31 in the axial direction makes it possible to downsize the electric steering column apparatus 1.

(4) The electric steering column apparatus 1 includes the steering column 3 supported on the vehicle body, the steering shaft 5 rotatably supported by the steering column, and the telescopic mechanism 7 driven by the electric motor 6. The steering column 3 has the tubular outer jacket 13, the tubular inner jacket 14b inserted into the outer jacket 13 so as to be axially movable relative to the outer jacket 13, and the mid jacket 14a interposed between the outer jacket 13 and the inner jacket 14b. The telescopic mechanism 7 has the tubular member 21 fixed to the outer peripheral surface of the mid jacket 14a and the telescopic nut 23, which is disposed inside the tubular member 21 and with which the shaft portion (screw shaft 22) of the electric motor 6 is threadedly engaged. The mid jacket 14a has the through hole 24 formed to pass through the mid jacket 14a and communicate with the inside of the tubular member 21, and the telescopic nut 23 has the stopper protrusion 25 formed to protrude through the through hole 24 into the mid jacket 14a. The elongated hole 26 formed in the inner jacket 14b along the axial direction is engaged with the stopper protrusion 25.

In the electric steering column apparatus 1, since the telescopic nut 23 having the stopper protrusion 25 is arranged to be inserted into the tubular member 21 fixed to the outer peripheral surface of the mid jacket 14a, it is possible to restrict relative rotation of the inner jacket 14b with respect to the mid jacket 14a. This eliminates the necessity for an additional stopper, and thus reduces the part count and improves the ease of assembly. This, in turn, eliminates the necessity for the space for attaching the stopper and further improves the flexibility of the layout.

Thus, the electric steering column apparatus 1 according to this embodiment simplifies the anti-rotation structure of the inner jacket 14b and also improve the ease of assembly.

(5) The bush 27 is disposed between the tubular member 21 and the telescopic nut 23.

The bush 27 restricts the amount of the stopper protrusion 25 protruding into the mid jacket 14a, and reduces vibration caused by the play between the tubular member 21 and the telescopic nut 23 or the play between the tubular member 21 and the stopper protrusion 25.

Incidentally, an electric steering column apparatus according to the present invention has been described using the foregoing embodiment as an example; however, the present invention is not limited to this embodiment but can employ other various embodiments without departing from the gist of the present invention.

What is claimed is:

1. An electric steering column apparatus comprising:
a steering column supported on a vehicle body;
a steering shaft rotatably supported by the steering column; and
a telescopic mechanism driven by an electric motor, wherein
the steering column has a tubular outer jacket and a tubular inner jacket inserted into the outer jacket so as to be axially movable relative to the outer jacket,
the telescopic mechanism has a tubular member fixed to an outer peripheral surface of the inner jacket and a telescopic nut that is disposed inside the tubular member and with which a shaft portion of the electric motor is threadedly engaged,
a pressing mechanism for reducing play between the outer jacket and the inner jacket has a first pressing portion disposed on the outer jacket and pressing a lower surface of the inner jacket upward and a second pressing portion disposed on an axially front end side of the outer jacket and pressing an upper surface of the inner jacket downward, and
the tubular member is disposed between the first pressing portion and the second pressing portion in an axial direction so as to face the second pressing portion in an up-down direction and fixed to the lower surface of the inner jacket.

2. The electric steering column apparatus according to claim 1, wherein the first pressing portion has a slide contact member in contact with the lower surface of the inner jacket at two points angularly spaced about the axis of the steering column by an angle between 90 to 120 degrees and a pressing member pressing the slide contact member against the lower surface of the inner jacket.

3. The electric steering column apparatus according to claim 2, wherein
an opening is formed in a lower surface of the outer jacket from a rear end side along the axial direction,
the tubular member is fixed to the lower surface of the inner jacket and is disposed in the opening, and
the pressing member is disposed to close an axially rear end portion of the opening, and the slide contact member is disposed between the pressing member and the lower surface of the inner jacket.

4. An electric steering column apparatus comprising:
a steering column supported on a vehicle body;
a steering shaft rotatably supported by the steering column; and
a telescopic mechanism driven by an electric motor, wherein
the steering column has a tubular outer jacket, a tubular inner jacket inserted into the outer jacket so as to be axially movable relative to the outer jacket, and a mid jacket interposed between the outer jacket and the inner jacket,
the telescopic mechanism has a tubular member fixed to an outer peripheral surface of the mid jacket and a telescopic nut that is disposed inside the tubular member and with which a shaft portion of the electric motor is threadedly engaged,
the mid jacket has a through hole passing through the mid jacket and communicating with an inside of the tubular member, and the telescopic nut has a stopper protrusion protruding through the through hole into an inside of the mid jacket, and
an elongated hole formed in the inner jacket along an axial direction is engaged with the stopper protrusion.

5. The electric steering column apparatus according to claim 4, wherein
a bush is disposed between the tubular member and the telescopic nut.

* * * * *